July 22, 1958 W. B. ZERN 2,844,175
CORNER CUTTING TOOL WITH GAUGE
Filed Oct. 13, 1955
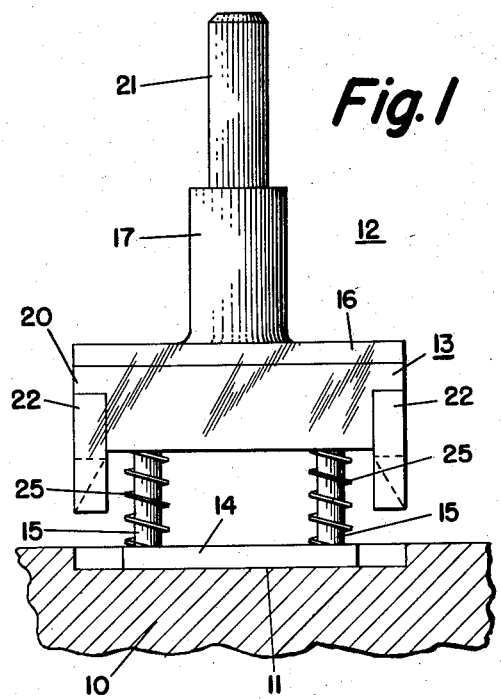
Fig. 1
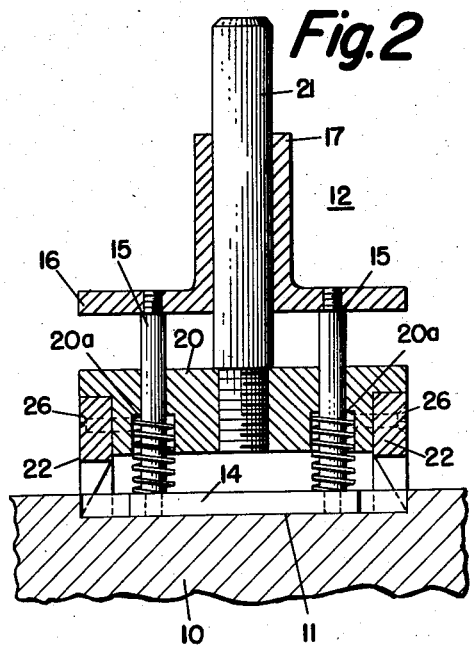
Fig. 2
Fig. 1A
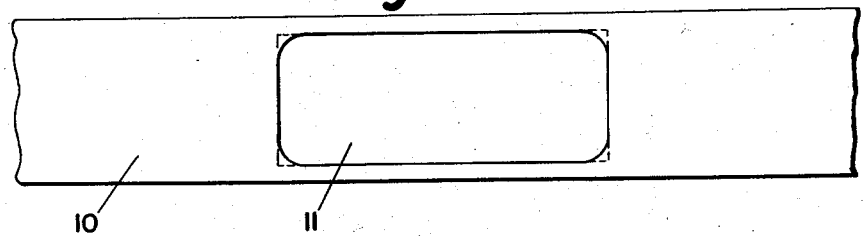
Fig. 3
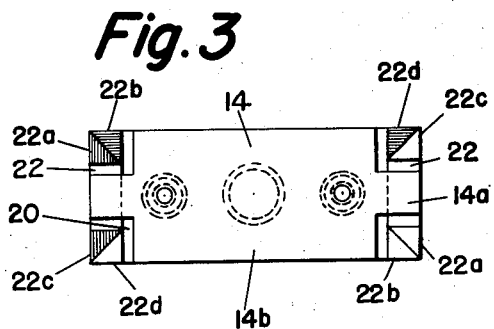
Fig. 4
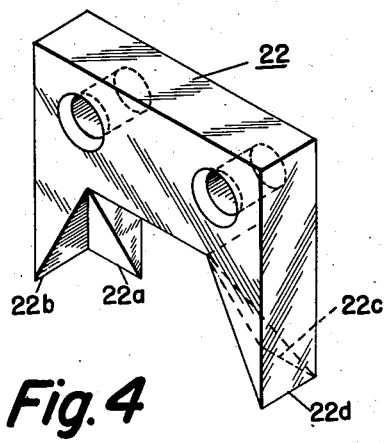

United States Patent Office 2,844,175
Patented July 22, 1958

2,844,175
CORNER CUTTING TOOL WITH GAUGE
Warren B. Zern, Montgomery County, Pa.
Application October 13, 1955, Serial No. 540,254
6 Claims. (Cl. 145—25)

This invention relates to a corner cutting tool with gauge and has for an object the provision of a cutting tool for cutting square corners in recesses in work such as in lockplate recesses, hinge recesses, striker plate recesses or the like in doors and jambs, the tool having a gauge for accurately locating the cutting tool with respect to the work and controlling the depth of entry of the cutting tool into the work.

This invention is particularly suited for use with woodworking apparatus for routing hinge seats or lock-plate seats in the edge of a door such, for example, as the jig assembly and guide for locating door lock recesses as disclosed in my Patent No. 2,605,791 and in my Patent No. 2,801,655, granted August 6, 1957, upon my copending application Serial No. 455,890, filed September 14, 1954. As shown in the aforesaid patents, woodworking apparatus of the foregoing type includes a template assembly adapted to position a template over the lock-receiving edge of a door. The template is provided with a rectangular cut-out corresponding to the size of the lock-plate to be installed in the door, and a routing tool such as shown in Fig. 1 of the aforesaid Patent No. 2,605,791 is adapted to be moved back and forth within the opening in the template to remove the wood from a corresponding area in the edge of the door beneath the template. As the routing tool is a rotating member, it will naturally leave a small amount of wood at the corners of the lock-plate seat. Since the great majority of door hardware including hinges and lock-plates have square corners, before the lock-plate can be assembled in the edge of the door, it is necessary to remove this wood from the corners. Heretofore this operation has been performed by means of a conventional single blade hand chisel, and while the results have been reasonably satisfactory, nevertheless it has left something to be desired from the standpoint of accuracy and speed. Speed is an important factor in woodworking apparatus of the foregoing type as such apparatus is designed to materially reduce the over-all time required to prepare a door with recesses for hanging and provide it with the necessary recesses and openings for the door lock.

In accordance with the present invention, there is provided a corner cutting tool comprising a cutter head having a pair of cutting edges intersecting to form a corner and guage means carried by the tool for relative movement between the cutter head and the gauge means. The gauge means has structure disposed on each side of the pair of cutting edges and in line with the edges to control the disposition of the cutting edges relative to the work during a cutting operation. More particularly, the gauge means is adapted to be inserted within a recess previously cut by a router with a pair of cutting edges of the tool being disposed directly above a corner of the recess by reason of the gauge means engaging the adjacent sides of the included corner.

In the preferred embodiment of the invention the corner cutting tool is provided with a pair of cutting edges for each corner of the recess, and the gauge means is adapted to engage the sides of the recess on each side of the corners of the recess. The cutting head that carries the cutting edges is movable relative to the gauge means, and as the gauge means is disposed between the work and the cutting head, the gauge means will limit the depth of entry of the cutting edges into the work. With the preferred embodiment of the invention all of the corners of the recess will be cut simultaneously and to a uniform depth and at predetermined locations relative to each other, thus providing for accurate and uniform work within much less time than previously required in cutting corners with the conventional woodworking chisel.

For a more detailed disclosure of the invention and for further objects and advantages thereof, reference is to be had to the following description taken in conjunction with the accompanying drawing in which:

Fig. 1 is an elevational view of the invention showing the novel tool in position on the edge of a door with the cutting head in the uppermost position preparatory to cutting the corners from a recess;

Figure 1A is a plan view of a lock-plate recess cut in the edge of a door by a router;

Fig. 2 is a cross-section of Fig. 1 with the cutting head of the tool in its lowermost position;

Fig. 3 is a bottom plan view of the tool shown in Fig. 1; and

Fig. 4 is a perspective view on enlarged scale of one form of cutting blade.

Referring to the drawing, in Fig. 1 my invention has been illustrated, by way of example, in connection with a door 10 having a recess 11, Fig. 1A, cut therein by a router and template assembly such as disclosed in my aforesaid patents. The novel corner cutting tool 12 is provided with a cutter head 13 and a guage means illustrated as a plate 14. The plate 14 is carried at the lower end of two posts 15, the upper ends of which are secured to a plate member 16 in any suitable manner as by threaded ends provided at the upper end of the post members 15 and adapted to be disposed in threaded openings in plate 16. A collar member 17 is provided to be gripped by the operator in using the tool, the collar 17 preferably being secured at its lower end to the upper plate 16 as by welding. The cutter head 13 comprises a movable block 20 to which is secured a plunger 21, the latter being adapted to extend through the collar 17 and an opening in plate 16. Depending from the bottom of block 20 are cutter blades 22 having a plurality of cutting edges 22a, 22b, 22c, 22d, one pair of which intersects at each corner of the block 20. Two pairs of cutting edges are disposed at each end of the block 20 with one edge of each pair being in alignment while the other edges of the pair are parallel to each other, thus forming adjacent corners at one end of a rectangle.

As shown in Fig. 3, the gauge plate 14 has been cut away at the corners to provide projections 14a and 14b that extend on each side of a pair of cutting edges with the outer edges of projections 14a and 14b being in line with the adjacent cutting edges of the pair to control the disposition of such cutting edges relative to the work during a cutting operation. More particularly, referring to Figs. 1A and 3, the projections 14a and 14b are adapted to engage the corresponding end and side of the precut recess 11. The pair of cutting edges disposed between projections 14a and 14b will be properly aligned by the latter projections for cutting a corresponding square corner from the recess 11. As the recess 11 has four corners to be cut, the cutting tool 12 preferably is provided with four pairs of cutting edges, each pair being disposed between a pair of projections such as 14a and 14b of gauge plate 14.

To operate the corner cutting tool, the gauge plate 14 is inserted into the recess 11 in the manner illustrated in Fig. 1. At this time the cutting head 13 is in its raised position with the cutter blades 22 disposed above and in alignment with the corresponding corners to be cut from the recess 11. The tool is gripped by the operator at collar 17, and by striking the plunger 21 by any suitable implement such as a mallet or hammer, the plunger 21 and the cutter head 13 will move from the upper position in Fig. 1 to the lowermost position shown in Fig. 2. During the foregoing movement the cutter blades 22 will be blowered with the cutter head 13 and will remove the wood from the corners of the recess 11. The cutter head 13 is adapted to be biased to its uppermost position as shown in Fig. 1 by means of the pair of coil springs 25, one of which is carried by each of posts 15 and is disposed between the guide plate 14 and the block 20 of cutter head 13. The block 20 may be provided with a recess 20a surrounding geach of posts 15 to provide a seat for the springs 25 into which they may be compressed during the downward stroke, Fig. 2.

It will be observed that the gauge plate 14 performs two important functions. First, it aligns each pair of cutting edges of the cutting tool with the corresponding corners to be cut from a recess such as recess 11, Fig. 1A, thus insuring a sharp square corner. Second, as the gauge plate 14 is disposed between the work and the cutter head 13, the plate 14 will limit the downward movement of the cutter head 13 and thus gauge the depth to which the cutting edges will enter the work.

The cutter blades 22 are also of a novel construction. It has been found that a very sturdy tool can be formed by providing each cutter blade 22 with two pairs of cutting edges with the two aligned edges 22a, 22c of the pair being disposed in one side of the cutter blade 22 and the two parallel cutting edges 22b and 22d being disposed at opposite ends of the blade 22, Fig. 4. The amount of material to be removed at the corners of the recess is relatively small, and it has been found that cutting edges having a width in the order of 1/4 inch will be sufficiently wide to take care of most applications. Accordingly, in one embodiment of the invention the cutter blade 22 was formed from steel stock 1/4 inch thick and having a width of 1 to 1 1/4 inches corresponding to the conventional width of a lock-plate. The parallel cutting edges 22b and 22d extended the full thickness of the cutter blade 22, and the cutting edges 22a and 22c extended 1/4 inch from each end of the cutter blade 22. The cutting edges 22a and 22b intersected at right angles to form one pair of cutting edges for cutting one corner from the rectangular recess, and cutting edges 22c and 22d intersected at right angles to form a second pair of cutting edges for cutting an adjacent corner from the rectangle 11. As may be seen in Fig. 4, the inner faces of the cutting edges are beveled in a direction extending inwardly and upwardly and thus aid in removing the corner chips from the recess 11 during the cutting operation. The outer faces of the cutting edges are straight and thus insure that the finished corners in the recess 11 will be square with each other to receive the lock-plate.

While the cutter blades 22 have each been shown as single blades having four cutting edges 22a–22d, it is to be understood that each pair of cutting edges may be formed on a separate cutter blade, or each cutting edge may be provided on a separate cutter blade. However, the preferred embodiment is illustrated in Fig. 4.

The cutter blades 22 may be secured to the block 20 of the cutter head 13 in any suitable manner and have been illustrated as being disposed within recesses at the opposite ends of block 20 and secured thereto as by screws 26, Fig. 2. By removing the screws 26, the cutters 22 may be removed from the block 20 and readily sharpened.

While the invention has been described in detail above particularly in regard to its application to cutting the corners from lock-plate recesses, it is also applicable to cutting the corners from other similar recesses such as for the striker plate and the hinges. The cutters and gauge plate of the novel corner cutting tool may be of any selected size and depending upon the size of the recess, the tool maybe used to cut one or more corners from the recess. For example, the size of the tool may be such as to cut both corners out of a hinge recess at the same time. However, if the recess is larger than the tool, the gauge plate will locate the cutters with respect to one corner at a time and remove the radius from the recess corner.

While there has been described a preferred embodiment of the invention, it will be understood that further modifications may be made without departing from the spirit and scope of the invention as set forth in the appended claims.

What I claim is:

1. A corner cutting tool comprising a cutter head having a pair of cutting edges intersecting to form a corner, and gauge means carried by said tool for relative movement toward and away from said cutter head, said gauge means having a structure disposed on each side of said pair of cutting edges and in line with the edges to control the disposition of the cutting edges relative to the work during a cutting operation.

2. A corner cutting tool comprising a cutter head having a first pair of cutting edges intersecting to form a corner, a second pair of cutting edges intersecting to form a corner, one cutting edge in each pair being disposed in line with each other, and gauge means carried by said tool for relative movement toward and away from said cutter head, said gauge means having structure disposed on each side of said pairs of cutting edges and in line with the edges to control the disposition of the cutting edges relative to the work concurrently to cut a pair of corners during a cutting operation.

3. A corner cutting tool according to claim 2 wherein the other cutting edges of the pairs are parallel to each other to cut adjacent corners of a rectangular area during a cutting operation.

4. A corner cutting tool comprising a cutter head having a plurality of pairs of cutting edges, each pair of cutting edges intersecting to form a corresponding number of corner cutters, one cutting edge in each pair being disposed in line with a cutting edge in an adjacent pair, and gauge means carried by said tool for relative movement toward and away from said cutter head, said gauge means having structure disposed on each side of said pairs of cutting edges and in line with the edges to control the disposition of the cutting edges relative to the work to concurrently cut a plurality of corners during a cutting operation.

5. A tool for cutting corners in a hinge-receiving recess or the like comprising guide means having gauge means depending therefrom, plunger means slidably carried by said guide means, a cutter head carried by said plunger means for reciprocation therewith, and blade means having a pair of cutting edges depending from said cutter head, said gauge means having structure disposed on each side of said pair of cutting edges and in line with the edges to control the disposition of the cutting edges relative to the corner of the recess during a cutting operation.

6. A tool for cutting the corners in a hinge-receiving recess or the like according to claim 5 wherein said gauge means includes a plate disposed substantially perpendicular to said blade means and adapted to rest on the bottom of the recess during a cutting operation, said structure comprising projections on said plate with the outer edges of said projections being in line with the adjacent cutting edges of said pair to control the disposition of said cutting edges relative to the corner of a recess during a cutting operation.

References Cited in the file of this patent

UNITED STATES PATENTS

| | | |
|---|---|---|
| 364,647 | Herz | June 14, 1887 |
| 393,880 | Binkerd | Dec. 4, 1888 |
| 703,160 | Stockman | June 24, 1902 |
| 1,051,754 | Olsen | Jan. 28, 1918 |
| 2,422,367 | Quigley | June 17, 1947 |
| 2,698,636 | Schlage | Jan. 4, 1955 |